United States Patent [19]

Priaroggia

[11] 3,940,300

[45] Feb. 24, 1976

[54] METHOD AND APPARATUS FOR EXTRUDING A LAYER OF EXTRUDABLE MATERIAL ON A BODY HAVING INACCESSIBLE ENDS

[75] Inventor: Paolo Gazzana Priaroggia, Milan, Italy

[73] Assignee: Industrie Pirelli S.p.A., Milan, Italy

[22] Filed: Jan. 14, 1974

[21] Appl. No.: 433,236

[30] Foreign Application Priority Data
Mar. 23, 1973  Italy................................ 22031/73

[52] U.S. Cl. ...................... 156/49; 156/51; 156/94; 156/244; 156/500; 264/36; 264/174; 425/13; 425/113

[51] Int. Cl.² B29C 27/24; H01B 7/02; H01B 13/14; H01B 13/24

[58] Field of Search ............. 156/244, 245, 500, 49, 156/51, 94; 425/13, 14, 113, DIG. 16; 264/36, 174

[56] References Cited
UNITED STATES PATENTS

| | | | |
|---|---|---|---|
| 2,287,163 | 6/1942 | Bishop .................................. | 156/49 |
| 2,563,829 | 8/1951 | Fitzgerald et al. ...................... | 156/49 |
| 2,587,930 | 3/1952 | Uschmann ........................... | 156/500 |
| 2,605,202 | 7/1952 | Reynolds ............................. | 156/244 |
| 2,767,431 | 10/1956 | DeLaubarede ..................... | 156/244 |
| 2,981,649 | 4/1961 | Metcalf, Jr. ........................... | 156/49 |
| 3,368,006 | 2/1968 | Gill ....................................... | 425/13 |
| 3,503,823 | 3/1970 | Richart et al. ...................... | 156/244 |
| 3,559,241 | 2/1971 | Chu ..................................... | 425/113 |
| 3,564,661 | 2/1971 | Atwell ................................. | 425/113 |
| 3,737,261 | 6/1973 | Hardesty ............................. | 425/113 |

*Primary Examiner*—Charles E. Van Horn
*Assistant Examiner*—Basil J. Lewris
*Attorney, Agent, or Firm*—Brooks Haidt Haffner & Delahunty

[57] ABSTRACT

Method and apparatus for replacing a portion of the insulating sheath of a submarine electric cable when the ends are inaccessible in which a split extrusion mold is placed around the cable and secured to the head of an extruder which is mounted on a carriage movable axially of the cable. The cable is held in a fixed position and as new insulating material is injected into the mold and extruded over the portion of the cable from which the old insulation has been removed, the carriage is moved at a rate dependent upon the extrusion rate. The interior of the mold may be subjected to vacuum. Alternatively, the mold may be held stationary and the cable moved axially thereof.

7 Claims, 3 Drawing Figures

METHOD AND APPARATUS FOR EXTRUDING A LAYER OF EXTRUDABLE MATERIAL ON A BODY HAVING INACCESSIBLE ENDS

The present invention relates to a method and an apparatus for applying a tubular layer of extrudable material on a portion of the core of a body of indefinite length, the ends of which are not accessible. In particular, said body of indefinite length can be an electric cable, for example, a telephone or power cable, while the tubular layer of extrudable material can be constituted by an insulating sheath made of elastomeric or plastomeric base material, e.g., a polyethylene sheath.

It is known that, in use, an electric cable can suffer damage due to accidental causes which are quite independent of the desire of those who have designed, manufactured and laid it. In particular, a submarine cable, for example, a submarine power cable, can be damaged to the extent of shearing in consequence of the impact of an anchor or another blunt body therewith.

In such a case, the cable has to be recovered from the sea bottom to carry out the necessary repair. Because of its length, which can be as much as some tens of kilometers, the cable is recovered only at its damaged portion and, since the cable ends are not accessible, the insulating sheath which is to be restored cannot be applied according to the methods usually adopted during the cable manufacture.

Up until the present time, repairs of this kind have been carried out only with relatively crude methods which have not been able to solve the problems appropriately. For example, in such methods a portion of sheath of a length of a few tens of centimeters was applied after the cable core was bared. To do this, a mold, formed by two half-shells hinged together, was used and was disposed around the portion to be repaired. When the mold was closed, it defined a cylindrical cavity, the diameter of which was equal to the outer diameter of the cable and into which the extrudable material was injected with a portable syringe. Then, the mold was opened and removed.

The method and apparatus described in the present invention permit the application of a much longer portion of insulating sheath, for example, about two meters in length, when the sheath is to be restored at a great distance from the two cable ends. The need to apply such a length of sheath takes place with a certain frequency with submarine power cables, during their use, as mentioned hereinbefore.

One object of the present invention is to provide a method for applying a layer of extrudable material on a portion of a previously bared core of an elongated body of indefinite length, the ends of which are not accessible, which method is characterized by the following steps:

1. Arranging about the body of indefinite length a split mold having a length shorter than the length of the layer to be applied, the mold being located in a zone immediately upstream of the portion of the body to which the layer is to be applied;
2. Connecting the mold in fixed relation to the head of an extruder;
3. Injecting the extrudable material into the mold by means of said extruder;
4. Causing, simultaneously with said injection of the material, a relative movement between the mold and the body of indefinite length along the axis of the latter and in the direction of said portion; and
5. Interrupting the injection of the material when the mold reaches a zone immediately downstream of said portion.

A further object of the invention is apparatus for carrying out said method in a satisfactory manner.

The objects and advantages of the invention will be apparent to those skilled in the art from the following description of the presently preferred embodiment thereof, which description should be considered in conjunction with the accompanying drawings in which.

Figure 1:
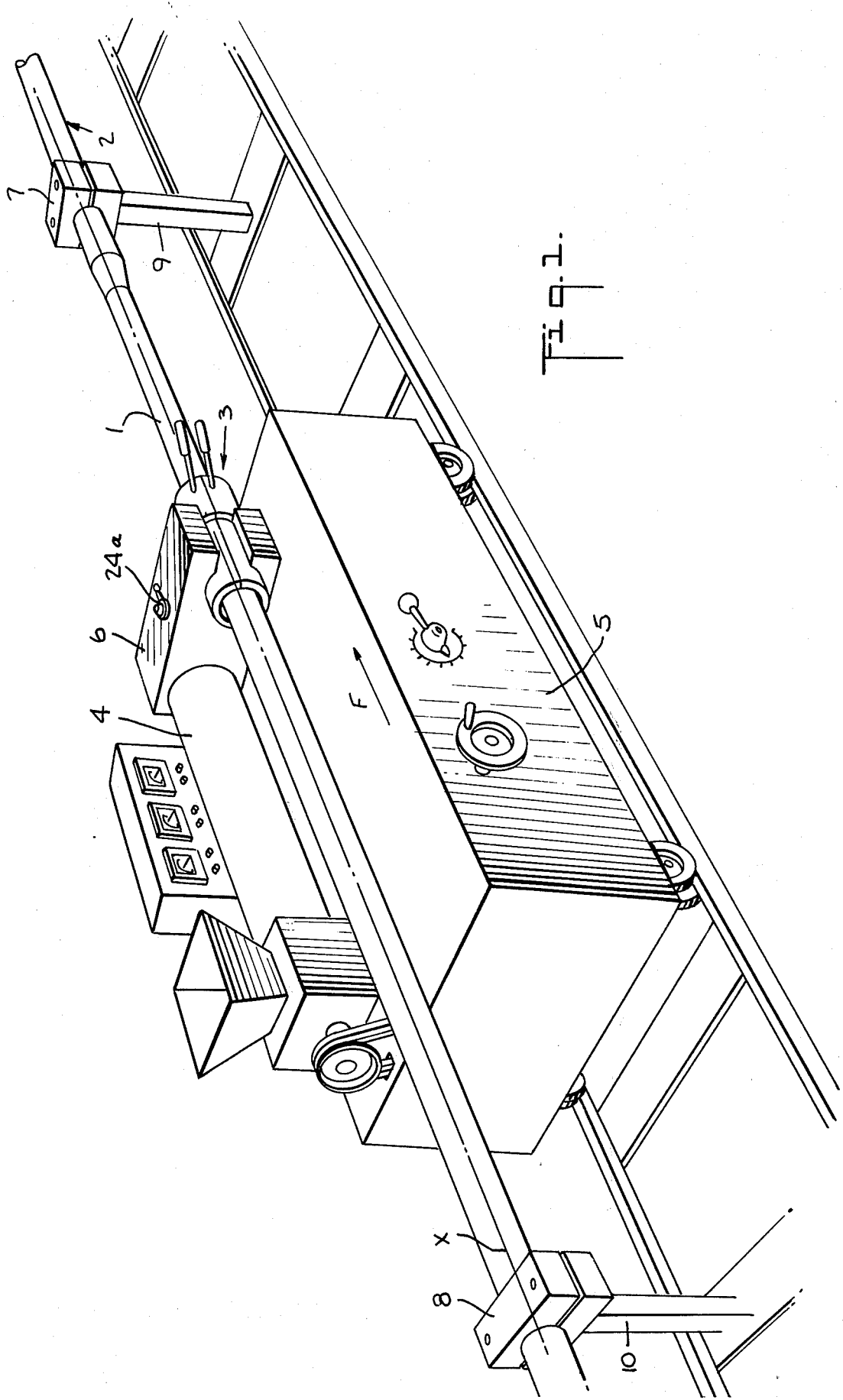
FIG. 1 is a diagrammatic, perspective view of the apparatus of the invention in its position prior to the application of an insulating sheath to a portion of an electric cable.

If it is desired to apply an insulating layer, e.g., a layer of polyethylene, on a portion 1, which may, for example, be about 2 meters long, of an electric cable 2, such portion 1 being at a great distance from the cable ends, an apparatus is used which comprises a mold 3, which will be described hereinafter, and a conventional screw extruder 4 for the thermoplastic material.

The extruder 4 and its associated equipment are supported by a carriage 5, preferably provided with a motor (not shown), and the head of the extruder 4 has the shape of a rigid metallic block 6 in which the mold 3 can be received, as described hereinafter, and so that the longitudinal axis X of the cable portion 1 coincides with the longitudinal axis of the mold 3 and is substantially parallel to the longitudinal axis of the extruder 4. The metallic block 6 also is supported by the carriage 5.

The apparatus also comprises clamps 7 and 8, which are mounted on stanchions 9 and 10 and are tightened around the sheath of the cable 2 in positions respectively downstream and upstream of the portion 1 to which the layer of insulating material is to be applied.

Figure 2:
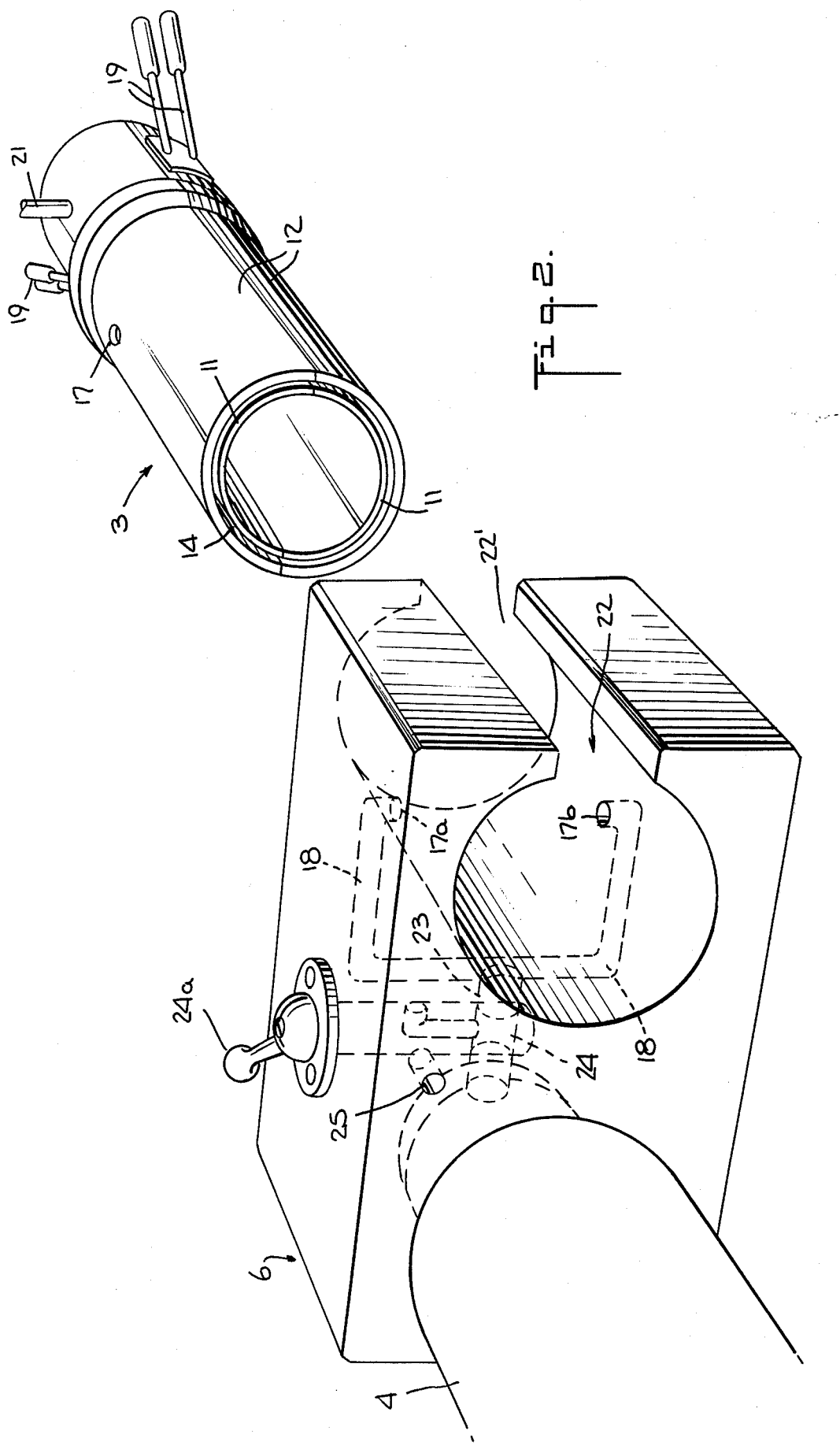
FIG. 2 is an enlarged, perspective view of the extruder head and mold shown in FIG. 1.
Figure 3:
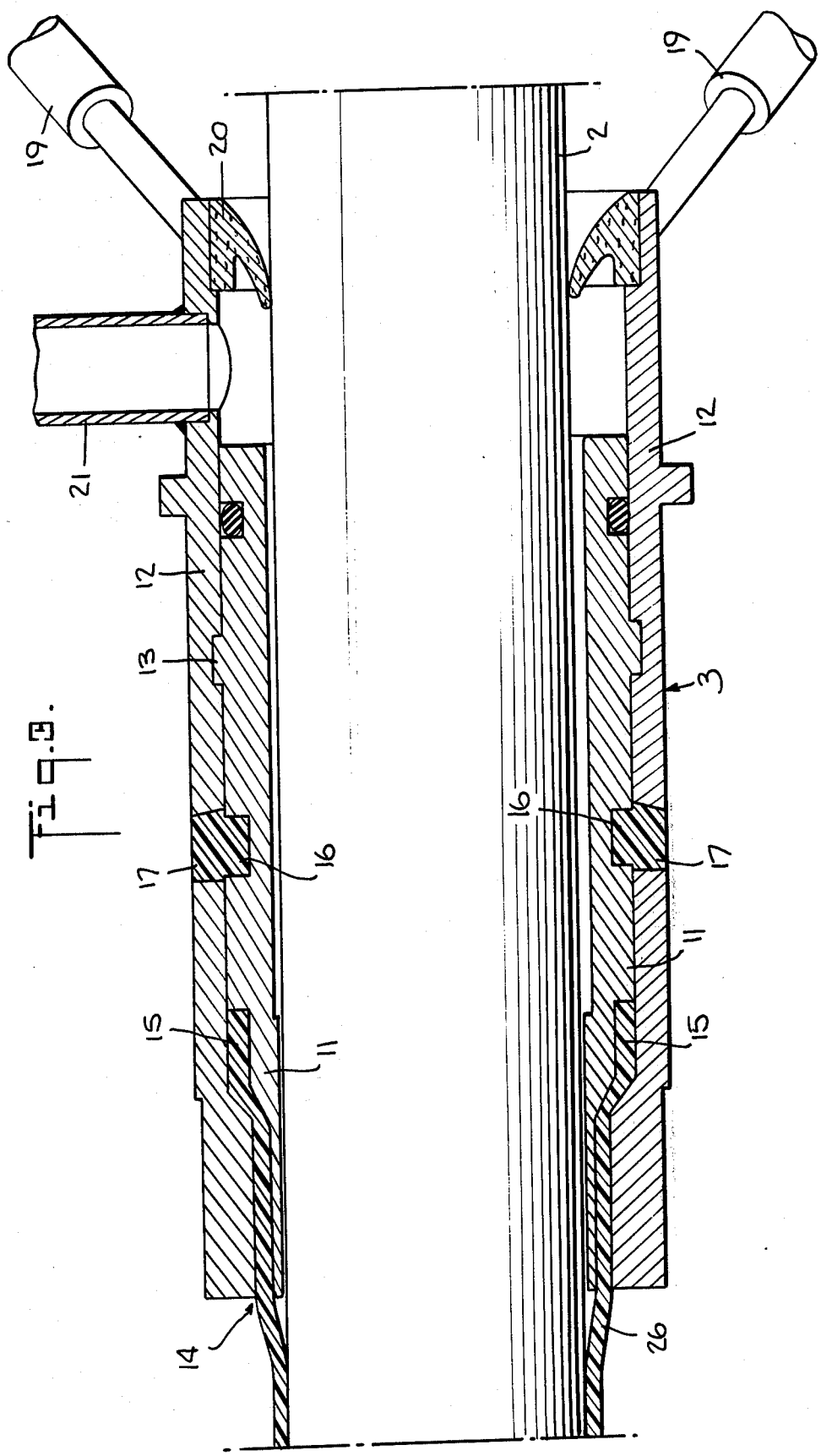
FIG. 3 is an enlarged, longitudinal, cross-sectional view of the mold shown in FIGS. 1 and 2.

FIGS. 2 and 3 show, in detail, the mold 3 in its closed position. Said mold 3 has a substantially cylindrical shape and comprises two radially inward, inner half-shells 11 and two radially outward, outer half-shells 12 which enclose the former and are maintained in longitudinally fixed relation thereto by means of an annular projection 13.

The inner diameter of the inner half-shells 11 is greater than the outer diameter of portions of the cable 2 other than the portion 1 to be repaired. At one end of the mold 3 there is an annular gap 14 between the two pairs of half-shells 11 and 12, through which gap 14 the extrudable material will pass immediately before forming the sheath 26, as described hereinafter.

The annular gap 14 extends to a groove 15 at its upstream end which is connected to a circumferential groove 16 between the inner shells 11 and the outer shells 12 by conventional, longitudinally extending passages (not shown) in the outer surface of the shells 11 which permit the insulating material to flow from the groove 16 to the groove 15, and hence, out of the gap 14. The insulating material is injected into groove 16 through two diametrically opposite holes 17 disposed so as to register with two holes 17a and 17b at the ends of small channels 18 in the block 6 forming the head of the extruder 4, when the mold 3 and the block 6 are connected together, as shown in FIG. 1.

The mold 3 also comprises two handles 19 for each of the outer half-shells 12, which aid in handling the mold 3, a semi-rigid ring 20, which is located at the end of the mold opposite to the end thereof at which the annular gap 14 is located and which assists in centering the cable 2 in the mold 3 and acts as an air seal, and a tube 21 which connects the interior of the mold 3 with a conventional vacuum pump (not shown).

The block 6 (FIG. 2) constituting the head of the extruder 4 comprises, in addition to the small channels 18, a cylindrical through cavity 22, provided with a lateral cut 22' having a width between its sides at least greater than the diameter of the portion 1 of the cable 2. The cavity 22 receives the mold 3 as shown in FIG. 1. The block 6 comprises another small channel 23 which connects the mouth of the extruder 4 with the small channels 18 to supply them with the extrudable material, and a valve 24, operable by the handle 24a which permits such supply or which interrupts the flow of the material from the head of the extruder 4 and directs it to the outside of the block 6 through an opening 25.

The operation of the hereinbefore described apparatus is started by introducing, through the cut 22', the bare portion 1 to be covered with the sheath 26 into the cylindrical cavity 22. The clamps 7 and 8, situated at opposite sides of the portion 1 and spaced from the latter, are tightened on the sheath of the cable 2. Then, the mold 3 is positioned around the cable 2 by initially joining together the inner half-shells 11 and subsequently enclosing them by the outer half-shells 12. The mold 3 is positioned in a zone between the portion 1 and the clamp 8, that is, upstream of the portion 1.

Thereafter, the mold 3, with the aid of the handles 19 and by moving it axially of the cable 2, is inserted into the through cavity 22 in the block 6 at the head of the extruder 4, the carriage 5 supporting the latter being positioned as illustrated in FIG. 1. The mold 3 is then firmly secured to the block 6 with any conventional means (not illustrated) and is, therefore, secured in a fixed position with respect to the carriage 5 and the extruder 4 (see FIG. 1).

Then, the vacuum pump is actuated to create, by means of the tube 21, a lowering of the air pressure interiorly of the mold 3, and the supply of the extrudable material to the mold 3 and the gap 14 is commenced.

As the insulating material flows out of the mouth of the extruder 4, the material passes through the small channel 23, the valve 24 being in the opened position, and then, in succession, through the small channels 18, the holes 17a, 17b and 17, the circumferential groove 16, the distribution groove 15 and the gap 14. As the material flows from the mold 3 through the annular gap 14, it is deposited in tubular form at the upstream end of the portion 1.

Simultaneously with the injection of the extrudable material into the mold 3, the motor of the carriage 5 is actuated causing the carriage 5 to advance along the axis X of the cable 2 in the direction indicated by the arrow F (FIG. 1) at a pre-established speed which is dependent upon the desired extrusion speed. In this way a tubular layer 26 of extrudable material is applied, which rebuilds the insulating sheath on the portion 1 of the cable 2 which it was necessary to repair. Said layer 26 terminates at the downstream end of the portion 1, namely, in a zone near the clamp 7. In fact, when the carriage 5 with the mold 3 has reached said position, the small channel 23 is closed by means of the valve 24 and the vacuum pump is stopped. After a predetermined time, necessary to allow cooling of the layer 26, the mold 3 is removed from the block 6 and is opened, thereby detaching it from the cable 2.

By doing this, the sheath just rebuilt is not damaged, because the inner diameter of the inner half-shells 11 is greater than the outer diameter of the cable 2.

The advantages of the hereinbefore described method and apparatus are quite evident. By their adoption, it is possible to repair rather long cable portions, in comparison with those which could be repaired by prior art methods and apparatus, namely, portions of several meters in length rather than of a few tens of centimeters in length. This is particularly appropriate for the repair of submarine cables which can suffer serious damage in use, independent of the desire of the manufacturers and users. Moreover, the present apparatus, besides being usable on land, can be easily placed on board cable-laying ships. The method can be carried out very quickly and can be adapted for cables of any diameter, provided that a suitable series of molds and blocks are available.

It will be understood by those skilled in the art that various modifications of the invention may be made without departing from the principles of the invention illustrated by the preferred embodiment hereinbefore described. For example, the relative movement between the mold 3 and the cable 2, along the axis of the latter, can be carried out by keeping the extruder 4 and the mold 3 stationary and by causing the cable 2 to slide inside the mold 3. Further, it is not necessary that the axis of the extruder 4 be parallel to the axis X of the cable 2.

In addition, the method and apparatus described is not restricted to the repair use described. For example, in some cases, they could be used during the manufacture of submarine power cables, when it is desired to repair a portion of the insulating sheath or to add an extra layer on a portion thereof.

What is claimed is:

1. In a method for applying a layer of extrudable material on a portion of an elongated body of indefinite length whose ends are not accessible, said portion having a predetermined cross-sectional dimension, comprising:

encircling said body at said portion by a split extrusion mold having at least one inlet opening, having means for extruding said layer on said body, having a length less than said portion and having a longitudinally extending, interior bore of a size greater than the cross-section of said body to permit relative longitudinal movement of said mold and said body;

connecting said mold to a source of said material in fixed relation to said mold;

while injecting said material from said source into said mold, causing relative movement between said mold and said body in a direction such that said portion passes through said mold and said layer is applied to said portion;

and terminating the injection of said material into said mold when said portion is covered by a layer of said material;

the steps of connecting said mold to said source, prior to injecting said material, by:

providing an extrusion head intermediate said source and said mold, said head having a longitudinally extending cavity defined by a unitary C-shaped wall, said cavity extending from one end to the other of said head for receiving said mold and engaging the exterior thereof, said head having a passageway therethrough with an outlet opening at the wall of said cavity for the passage of said material from said source to said mold and said head, in the form assumed thereby when it engages said mold, said head having a single longitudinally extending, unobstructed slot extending from one end to the other thereof and from the exterior of said head to said cavity to provide a longitudinally extending entrance into said cavity from the exterior of said head, said slot having a constant width at least as great as said predetermined dimension but less than the cross-sectional exterior of said mold;

inserting a length of said body into said head cavity through said slot and in a direction transverse to the length of said body;

encircling said body by said mold by placing it around a length of said body outside said head;

moving said mold and said head relative to each other in a direction longitudinally of said body to insert said mold into said head cavity between said body and said head and to align said outlet opening of said head with said inlet opening of said mold; and holding said mold in fixed relation to said head.

2. A method as set forth in claim 1, wherein said predetermined dimension of said portion is less than the cross-sectional dimension of the portions of said body adjacent thereto and wherein said portion is inserted into said head cavity through said slot.

3. A method as set forth in claim 1, wherein said elongated body is a relatively long electric cable having a core surrounded by a sheath, said portion is a portion of said cable from which said sheath has been removed and said material is sheath material.

4. In apparatus for applying a layer of extrudable material on a portion of a relatively long body with inaccessible ends, said portion having a predetermined cross-sectional dimension, said apparatus comprising:

a mold having a longitudinally extending bore with an inner periphery at least equal to the outer periphery of said body for slidably receiving said body within said bore, said mold being longitudinally split to permit placement thereof around and removal thereof from said body and said mold having an annular extrusion gap which, when said mold is placed around said body, extends around said body, said mold also having an injection inlet opening and passageways leading from said opening to said gap for the flow of said material from said opening to said gap;

an extruder for supplying said material to said mold;

and means for moving one of said mold and said body and thereby producing relative movement therebetween during the extrusion of said material; the combination therewith of:

a head having a through cavity extending from one end to the other thereof for receiving said mold therein with the wall of said cavity slidably engaging the exterior of said mold, said wall being unitary and C-shaped in cross-section with a single longitudinal slot having a width greater than said predetermined dimension but less than the cross-sectional dimension of said mold extending from one end to the other of said head and from the exterior of said head to said cavity to provide an opening for the insertion of said portion into said cavity in the direction transverse to the length of said body, said head having a material passageway therein extending from said extruder to an outlet opening at said cavity wall, said outlet opening being in register with said inlet opening of said mold with said mold in said cavity.

5. Apparatus as set forth in claim 4, wherein said mold comprises two pairs of half-shells, one pair of said shells fitting within the other pair thereof with said annular gap therebetween.

6. Apparatus as set forth in claim 5, wherein one of said pairs of shells has a circumferentially extending projection and the other of said pairs of shells has a circumferentially extending recess for receiving said projection and thereby preventing longitudinal movement of said pairs of shells with respect to each other.

7. Apparatus as set forth in claim 4, wherein said inner periphery of said bore of said mold is greater than the outer periphery of said body to provide space between the wall of said bore and said body, said mold further comprises semi-rigid sealing means at a portion of said mold spaced from said gap and extending inwardly from the wall of said bore, said sealing means being slidably engageable with said body for preventing the passage of air between said sealing means and said body, and connecting means communicating with the interior of said mold intermediate said sealing means and said gap for evacuating air therefrom.

* * * * *